US009111577B2

(12) United States Patent
Bhogal et al.

(10) Patent No.: US 9,111,577 B2
(45) Date of Patent: Aug. 18, 2015

(54) STORAGE SPACE SAVINGS VIA PARTIAL DIGITAL STREAM DELETION

(71) Applicant: INTERNATIONAL BUSINESS MACHINES CORPORATION, Armonk, NY (US)

(72) Inventors: Kulvir S. Bhogal, Fort Worth, TX (US); Gregory J. Boss, Saginaw, MI (US); Lydia M. Do, Raleigh, NC (US); Rick A. Hamilton, II, Charlottesville, VA (US); James W. Seaman, Falls Church, VA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/025,249

(22) Filed: Sep. 12, 2013

(65) Prior Publication Data

US 2015/0071599 A1    Mar. 12, 2015

(51) Int. Cl.
*G11B 20/10* (2006.01)
*H04N 5/765* (2006.01)

(52) U.S. Cl.
CPC .......... *G11B 20/10527* (2013.01); *H04N 5/765* (2013.01); *G11B 2020/10851* (2013.01)

(58) Field of Classification Search
USPC .................................. 386/294–295, 360, 289
See application file for complete search history.

(56) References Cited

U.S. PATENT DOCUMENTS

| 7,783,249 | B2* | 8/2010 | Robinson ..................... 455/3.06 |
| 7,889,973 | B2 | 2/2011 | Poslinski et al. |
| 2002/0054750 | A1* | 5/2002 | Ficco et al. ..................... 386/46 |
| 2003/0115274 | A1* | 6/2003 | Weber ........................... 709/206 |
| 2003/0133022 | A1* | 7/2003 | Melton ...................... 348/231.2 |
| 2006/0062196 | A1* | 3/2006 | Cai et al. ....................... 370/345 |
| 2010/0100677 | A1* | 4/2010 | McKean et al. ............... 711/114 |
| 2012/0087637 | A1* | 4/2012 | Logan et al. .................. 386/241 |
| 2012/0174178 | A1 | 7/2012 | Ryal |
| 2013/0007810 | A1* | 1/2013 | Martch et al. .................. 725/53 |

FOREIGN PATENT DOCUMENTS

EP           1553779 A1      7/2005

* cited by examiner

*Primary Examiner* — Helen Shibru
(74) *Attorney, Agent, or Firm* — Law Office of Jim Boice (57) ABSTRACT

A method, computer system, and/or computer program product enables a reuse of media storage space via partial file deletion. Multiple friends in a same social circle, which together have control of multiple media storage devices that are storing all segments of a media file, are identified. A last friend from the multiple friends, who has control of a last media storage device to have a last copy of a particular segment of the media file, is identified. The last media storage device is the only media storage device, from the multiple storage devices, to have a copy of the particular segment of the media file. The last media storage device is prevented from deleting the particular segment of the media file until another of the multiple storage devices stores a copy of the particular segment of the media file.

4 Claims, 4 Drawing Sheets

FIG. 4

STORAGE SPACE SAVINGS VIA PARTIAL DIGITAL STREAM DELETION

BACKGROUND

The present disclosure relates to the field of computers, and specifically to computers that utilize storage devices to store digital data. Still more particularly, the present disclosure relates to selectively deleting data from a storage device.

Certain storage devices, such as digital video recorders (DVRs), only allow the deletion of an entire program stream. Many times, deletion of a portion of a program stream may be desirable, while leaving the remainder of the program on the DVR.

SUMMARY

A method, computer system, and/or computer program product enables a reuse of media storage space via partial file deletion. Multiple friends in a same social circle, which together have control of multiple media storage devices that are storing all segments of a media file, are identified. A last friend from the multiple friends, who has control of a last media storage device to have a last copy of a particular segment of the media file, is identified. The last media storage device is the only media storage device, from the multiple storage devices, to have a copy of the particular segment of the media file. The last media storage device is prevented from deleting the particular segment of the media file until another of the multiple storage devices stores a copy of the particular segment of the media file.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

With high-density recording formats becoming more prevalent, a single recorded digital stream can take up a substantial amount of the available storage space on a digital recorder. Longer program streams require more space, and arguably, thus have lower chances of being viewed in one sitting. Another confounding factor is that a typical family may have multiple users recording and partially viewing such programming.

As an example, a high definition (HD) recording of a three hour concert may take up the equivalent of six hours of standard definition recording space, which may be 10% of the space on a typical digital video recorder (DVR). The viewing user might, for instance, watch one hour of the HD show in a setting. This watched content might potentially free up two hours of standard definition recording space (five percent of the total recording storage space in the example) if the watched portion were deleted, freeing space for additional recordings. With multiple users sharing a given DVR, the accumulated wasted space, and thus potential space savings, multiplies.

Additionally, it may be considered that most recorded programming falls into either content which the user knowingly likes or those which they are exploring. In the latter case, users may record a new program/show to "check it out." In these scenarios, there is a distinction between regular shows and essentially "temporary" programming. Utilizing this distinction in order to optimize placement of recordings on DVRs provides for an opportunity into smarter space management. The presently disclosed invention thus provides a process for assisting in recording space management via an interface to provide for partial program stream deletion.

Content recorded and stored on DVR type devices are serial digital streams, and as such, it can be established where in a recorded stream a viewer is accessing, and to mark the stopping point of such viewing. With such a "stopping point marker" in place, a user/system is provided with the option of deleting the content of the digital stream behind the marker, that is, the already viewed portion of the content.

Previous DVR space management techniques are able to erase an entire program, including both watched and unwatched portions of a program. That is, current DVR technology performs "all or nothing" data deletion, and thus much space is wasted on the DVR maintaining data that has already been viewed. Thus, in prior art solutions, there is no distinction/knowledge of programming as applied to space management; all data streams are equal.

Figure 1:
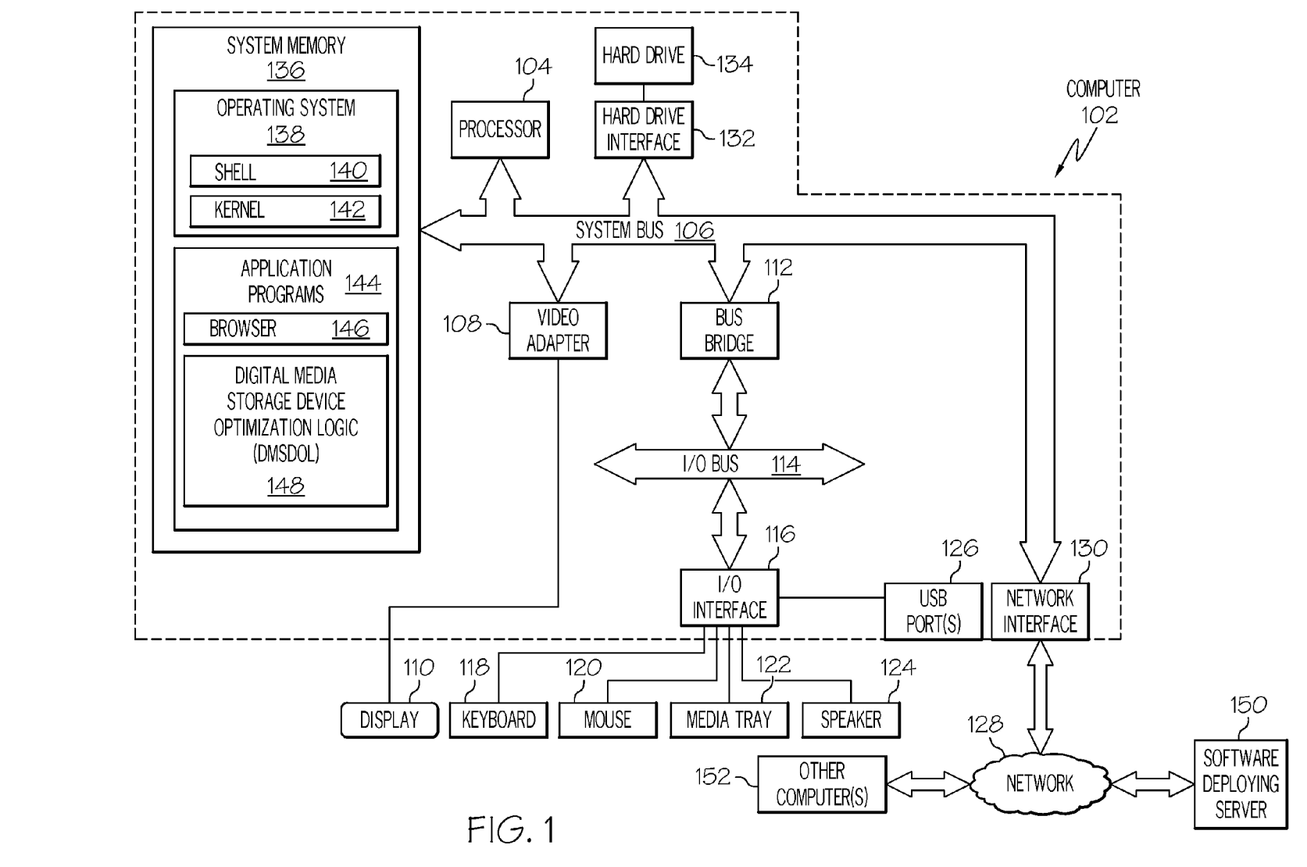
FIG. 1 depicts an exemplary computer in which the present disclosure may be implemented.

With reference now to the figures, and in particular to FIG. 1, there is depicted a block diagram of an exemplary computer 102, which may be utilized by the present disclosure. Note that some or all of the exemplary architecture, including both depicted hardware and software, shown for and within computer 102 may be utilized by software deploying server 150 and/or other computer(s) 152.

Computer 102 includes a processor unit 104 that is coupled to a system bus 106. Processor unit 104 may utilize one or more processors, each of which has one or more processor cores. A video adapter 108, which drives/supports a display 110, is also coupled to system bus 106.

System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), a printer 124, and (if a VHDL chip 137 is not utilized in a manner described below), external USB port(s) 126. While the format of the ports connected to I/O interface 116 may be any known to those skilled in the art of computer architecture, in one embodiment some or all of these ports are universal serial bus (USB) ports.

As depicted, computer 102 is able to communicate with a software deploying server 150 and/or other computer(s) 152 via network 128 using a network interface 130. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present disclosure will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other described computer systems.

Application programs 144 in computer 102's system memory (as well as software deploying server 150's system memory) also include a digital media storage device optimization logic (DMSDOL) 148. DMSDOL 148 includes code for implementing the processes described below, including those described in FIG. 2. In one embodiment, computer 102 is able to download DMSDOL 148 from software deploying server 150, including in an on-demand basis, such that the code from DMSDOL 148 is not downloaded until runtime or otherwise immediately needed by computer 102. Note further that, in one embodiment of the present disclosure, software deploying server 150 performs all of the functions associated with the present disclosure (including execution of DMSDOL 148), thus freeing computer 102 from having to use its own internal computing resources to execute DMSDOL 148.

The hardware elements depicted in computer 102 are not intended to be exhaustive, but rather are representative to highlight essential components required by the present disclosure. For instance, computer 102 may include alternate memory storage devices such as magnetic cassettes, digital versatile disks (DVDs), Bernoulli cartridges, and the like. These and other variations are intended to be within the spirit and scope of the present disclosure.

Note that in the description below, the terms "program", "data stream", "serial data stream", "active stream", "video content", and "program recording" are used interchangeably to describe digital content that is streamed to, and then buffered and/or recorded on, a media storage device, such as a digital video recorder (DVR).

Figure 2:
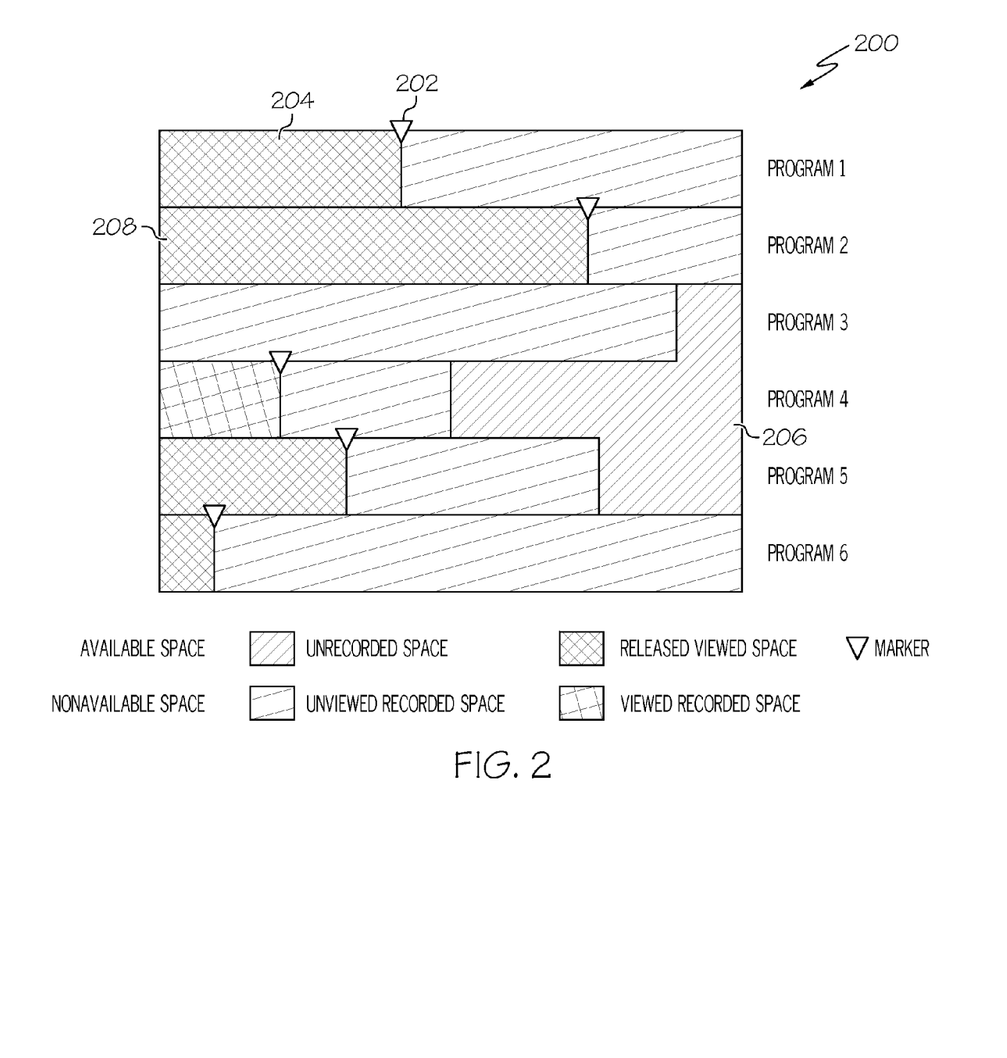
FIG. 2 illustrates changes to the usage of recording media in a digital video recorder (DVR) in an exemplary embodiment of the present invention.

With reference now FIG. 2, changes to the usage of used space on recording media in a DVR in an exemplary embodiment of the present invention are presented, as depicted in a recording graph 200. As depicted, as each serial data stream (i.e., one of programs depicted as programs 1-6) is viewed by a user, the viewing location within the serial data stream is tracked. In one embodiment, each of the programs 1-6 are buffered and/or stored on the DVR. Upon a context switch, such as the user selecting "stop playing this recording," the user changing the channel to a live show or different recording, or other such activities resulting in ending the viewing of the active recorded stream, a marker (e.g., marker 202) is inserted in the data stream at the point where viewing ceased. As depicted in FIG. 2, areas (e.g., area 204) "behind" the markers have been viewed by a particular user, and thus are eligible for deletion. In one embodiment the deletion eligible content would be automatically deleted. In a sub-embodiment, this automatic deletion occurs are some "grace period" (e.g., one hour), in order to allow the user time to override the automatic deletion.

In one embodiment, upon ceasing viewing of the active stream and after the marker has been placed, a user interface action occurs (i.e., a menu pops up on a user display, such as display 110 shown in FIG. 1), thus prompting the viewer to authorize or block the deletion of the already viewed content. In one embodiment, the menu pops up on the display that is showing the video content. In one embodiment, the menu pops up on a display other than that which is showing the video content (e.g., a smart phone, a laptop computer, etc.). In one embodiment, the menu pops up on both the display that is showing the video content and a display that is not showing the video content.

In the example depicted in FIG. 2, viewers of the different program streams 1-6 have allowed deletion of eligible content for program streams 1-2, 5, and 6, while the viewer of program stream 4 elected to save the already viewed portion of the program, thus not making that space eligible for reclaim.

In one embodiment, the present invention addresses techniques for managing overwrites of eligible space, with a consideration for the situation in which a user desires to rewind a program into space that has been marked as deletion eligible. For example, consider the recording graph 300 in FIG. 3. A new recording, such as program 7, first occupies unrecorded free space 206 from FIG. 2 (now depicted as used space 306 in FIG. 3) within the DVR. If space 306 is sufficient for recording all of program 7, it is solely used for the new recording of that program stream (program 7). If one or more new recordings exhaust the available unrecorded free space (e.g., free space 206), the present invention then executes an algorithm to determine optimal recording space usage based on the current storage environment.

For example, if it is determined that recorded program 2 has been substantially viewed, it thus becomes less likely that a rewind operation or restart of this program from an earlier point would become desirable. As such, the additional space required to record program 7 is utilized from the "back" of (i.e., the beginning of) the eligible deletion data (e.g., space 208 depicted in FIG. 2) from program 2, thus allowing the recording of some or all of program 7 in space 308 shown in FIG. 3. Even with the new recording of program 7 over previously viewed content from program stream 2, there is still considerable rewind capability for program 2, and other recorded data streams are not affected at all.

Figure 3:
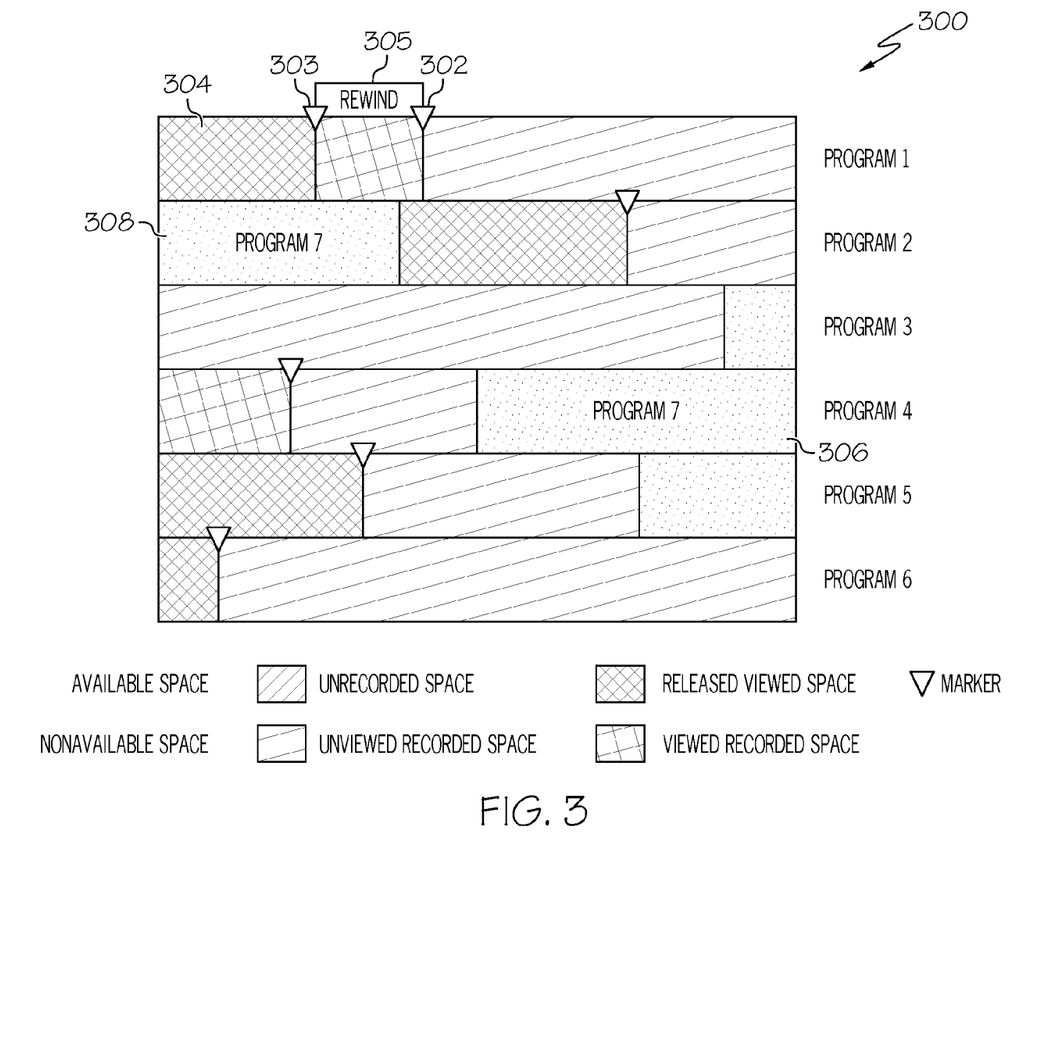
FIG. 3 depicts a new recording on a DVR in an exemplary embodiment of the present invention.

In one embodiment described in FIG. 3, the viewer has engaged the rewind function for program 1 after having previously viewed the content stream, having ceased said viewing, and having approved deletion of the already viewed content, as indicated by markers 305. In this example, since no portion of program 1 has yet been deleted (overwritten), the rewind and/or restart functions are available all the way back to the beginning of the program recording. In one embodiment, the rewind indicates renewed interest in a previous portion of the program, and as such, moves the play marker back to the furthest point of rewind.

In one embodiment, the original marker 302 (analogous to marker 202 shown in FIG. 2) remains in place, and in yet another embodiment both markers 305 are established such that the forward marker 302 indicates the amount of content viewed and the rear marker 303 indicates the limit to which a new recording may use the space 304 (analogous to space 204 shown in FIG. 2). In one embodiment, data that is marked for deletion, or deletion eligible, is not actually immediately deleted. In order to save processing time, the space is simply marked as "free," and is only actually deleted (overwritten) when that space is required for a new operation.

Figure 4:
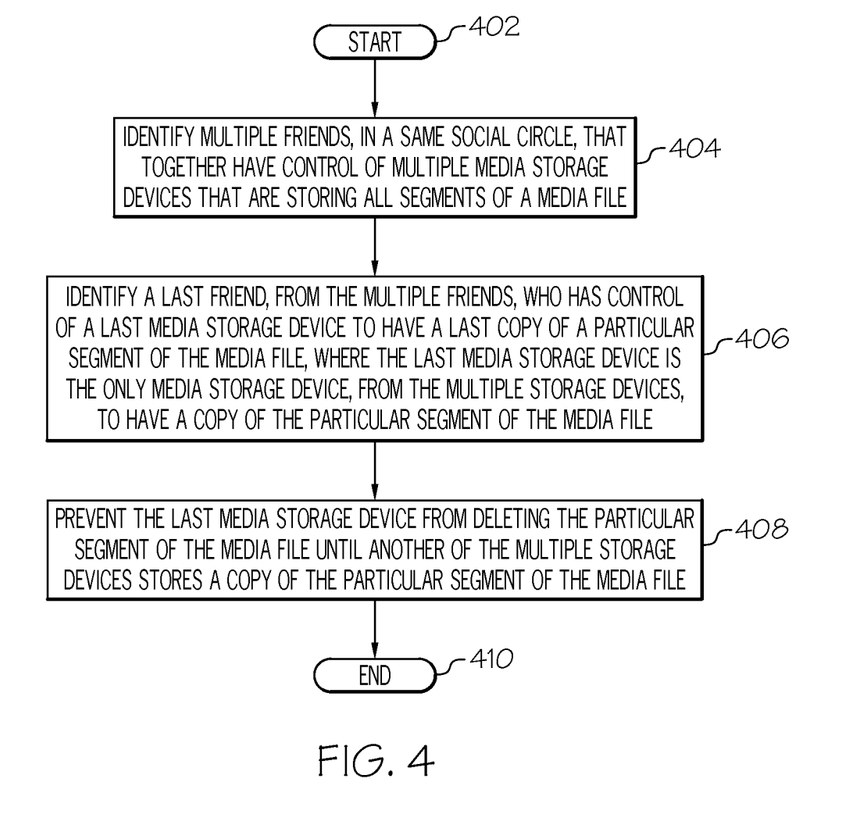
FIG. 4 is a high level flow chart of one or more exemplary steps taken by one or more processors to selectively delete digital data from a storage device.

With reference now to FIG. 4, a high level flow chart of one or more steps taken by one or more processors for optimizing use of space on a media storage device, through the reuse of media storage space via partial file deletion, is presented. After initiator block 402, one or more processors identify multiple friends who are in a same social circle (block 404). This "social circle" is a group of persons who are members of a same social grouping via a social media network (e.g., an online social networking service, in which social friends and/or other persons having common interests, geographical locations, etc. are grouped together), a user-action defined group (e.g., users who subscribe to a same rich site summary (RSS) feed), etc. In one embodiment, together these friends have control of multiple media storage devices that are storing all segments of a same media file. In one embodiment, the media storage devices are from a group consisting of a Videocassette Recorder (VCR), a Personal Video Recorder (PVR), a Direct Access Storage Device (DASD), a hard file, and a video surveillance media. In one embodiment, the media file is from a group consisting of a text document, a video file, a data stream, and an audio file.

As described in block 406, one or more processors then identifies, a last friend from the multiple friends. This "last friend" is a person/user who has control of a last media storage device to have a last copy of a particular segment of the media file. That is, the last media storage device is the only media storage device, from the multiple storage devices, to have a copy of the particular segment of the media file.

As described in block 408, one or more processors then prevent the last media storage device from deleting the particular segment of the media file until another of the multiple storage devices stores a copy of the particular segment of the media file. The process ends at terminator block 410.

Note that, in one embodiment, all of the media storage devices described herein are able to communicate with one another, in order to exchange portions of specific media files. For example, one or more of the other computer(s) 152 depicted in FIG. 1 may contain a particular segment of a program in its media storage device (e.g., hard drive 134). Only if one or more of the other computer(s) 152 has that particular segment will computer 102 (also shown in FIG. 1) be allowed to erase it from its media storage device, since computer 102 is able to access the media storage device in the other computer(s) 152 via the network 128.

In one embodiment, where the media file is in a first format, the method further comprises: locating, by one or more processors, a copy of the particular segment of the media file in a second format in a different media storage device, wherein the different media storage device is different from the last media storage device, and wherein the different media storage device is one of the multiple media storage devices; and in response to one or more processors determining that said another of the multiple storage devices does not have a copy of the particular segment of the media file in the first format, retrieving the copy of the particular segment of the media file in the second format from the different media storage device. That is, if the needed backup is not found in the original format of the program, but is found in another format, then that other format is used at the backup.

In one embodiment, each of the multiple media storage devices contains a different media file from multiple media files, wherein a particular media storage device stores a particular media file. For example, a first DVR has program 1 depicted in FIG. 2, a second DVR holds program 2, etc. In this embodiment, one or more processors determines which of the multiple media files is overwritten according to criteria of: a ratio of watched to unwatched space for the specific media file; an amount of time since the particular media file was last viewed; a percentage of watched space in the particular media storage device as compared to each other media storage device from the multiple media storage devices; and a historical analysis showing a propensity to rewind and replay, in its entirety, the particular media file based on a genre of the particular media file.

That is, in one embodiment, several criteria are evaluated to achieve an optimal destination for a current recording. In the case where there are multiple programs that could be overwritten with a currently scheduled recording, a determination is made as to which program (or multiple programs) should be overwritten. In FIG. 3, for example, there are four programs eligible for being partially overwritten: programs 1, 2, 5 and 6. Program 7 is the currently scheduled recording, and the following exemplary criteria are used to determine which program should be (will be) overwritten: 1) a ratio of watched to unwatched space in a single program; 2) a time since last viewed in a single program; 3) a percentage of watched space as compared to all eligible programs; and/or 4) a historical analysis showing propensity to rewind and/or replay the program in its entirety based on the genre of the (individual) program or the program's series. In one embodiment, these criteria are weighted. For example, criteria (1) and/or (4) may be weighted more heavily than criteria (2), based on historical data regarding rewind/replay tendencies of the users.

In yet another embodiment of this invention, deletion is substituted by, or used in combination with compression in order to increase free space from viewed data streams. In this embodiment, compression is utilized as much as possible until further compression would derive no additional space, at which point the deletion algorithm would ensue, returning to using compression when once again viable.

Thus, in one or more embodiments described herein, friends in the same social circle or associated by DVR capabilities (for example everyone in a neighborhood, or the same house or apartment complex) each store references to the portions of content already viewed which also exist on other group-associated DVRs. This allows the already-viewed content to be overwritten, but still allows for the retrieval of the overwritten (missing) content by pulling it from a friend/neighbor's DVR (if needed). For example, assume that Greg and Jim both regularly record the television series entitled "Program X", and Greg and Jim each have episode 2 recorded. Greg has watched half of this episode; Jim has also watched half of it. Greg's DVR overwrites the first 15 minutes of the 45 minute episode, but Jim's DVR has not yet overwritten his. Greg tells his DVR to "start over" so his family can watch the episode with him, but the content is missing. Greg's DVR displays a message "Please wait while retrieving missing content . . . ", at which time Greg's DVR is pulling down the missing 15 minutes from Jim's DVR.

Thus, the present invention makes it more unlikely that a segment of watched video will be overwritten whenever that is the only single portion available on any of the social circle's collective recordings. As described herein, the present invention introduces novel techniques and algorithms to improve space utilization and efficiency in media storage devices such as DVRs.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the invention of the present application in detail and by reference to illustrative embodiments thereof, it will be apparent that modifications and variations are possible without departing from the scope of the invention defined in the appended claims.

What is claimed is:

1. A method of reusing media storage space via partial file deletion, the method comprising:
    identifying, by one or more processors, multiple friends, in a same social circle, that together have control of multiple media storage devices that are storing all segments of a media file, wherein the media file is a video file, wherein each of the multiple media storage devices contains a different media file from the multiple media files, wherein a particular media storage device stores a particular media file, wherein the media file is in a first format, and wherein the social circle is a group of persons who are members of a same social grouping via a social media network that groups together persons that have common interests and are from a same geographical location;
    identifying, by one or more processors, a last friend, from the multiple friends, who has control of a last media storage device to have a last copy of a particular segment of the media file, wherein the last media storage device is the only media storage device, from the multiple media storage devices, to have a copy of the particular segment of the media file;
    preventing, by one or more processors, the last media storage device from deleting the particular segment of the media file until another of the multiple media storage devices stores a copy of the particular segment of the media file;
    detecting, by one or more processors, a marker on the video file, wherein the video file contains video content that is being displayed to a user, wherein the video content has been completely stored on recording media in a digital video recorder (DVR), and wherein the marker identifies a last position in the video content that has been displayed to a user before the user stopped playing the video content;
    identifying, by one or more processors, space on the DVR that holds content, from the video content, that has already been displayed to the user, wherein the marker identifies an endpoint of the content that has already been displayed to the user;
    in response to the user ceasing to view the video content, presenting, by one or more processors, a pop-up menu on a user display, wherein the pop-up menu provides options for controlling deletion of video content;
    receiving, by one or more processors, a user input from the pop-up menu, wherein the user input indicates an instruction from the user to automatically delete already viewed content from the video content, wherein the already viewed content has been presented to the user;
    delaying, by one or more processors, automatic deletion of the video content that has already been displayed to the user until after a predefined grace period, wherein automatic deletion of the video content can be overridden by the user during the predefined grace period;
    detecting, by one or more processors, that the predefined grace period has passed after receipt of the user input from the pop-up menu;
    in response to detecting that the predefined grace period has passed after receipt of the user input from the pop-up menu, deleting the already viewed content from the video content;
    determining, by one or more processors, that the content from the video content that has already been displayed to the user includes a first portion and a second portion of the video content, wherein the first portion is stored in a first area of the recording media in the DVR, wherein the second portion is stored in a second area of the recording media in the DVR, and wherein the second area of the recording media in the DVR follows the first area of the recording media;
    storing, by one or more processors, new content on the first area of the recording media while reserving the second area of the recording media for rewinding operations, wherein the rewinding operations allow the user to re-view the second portion from the second area of the recording media;
    locating, by one or more processors, a copy of the particular segment of the media file in a second format in a different media storage device, wherein the different media storage device is different from the last media storage device, and wherein the different media storage device is one of the multiple media storage devices;
    in response to one or more processors determining that said another of the multiple storage devices does not have a copy of the particular segment of the media file in the first format, retrieving the copy of the particular segment of the media file in the second format from the different media storage device;
    weighting, by one or more processors, criteria for:
        a ratio of watched to unwatched space for the particular media file;
        an amount of time since the particular media file was last viewed;
        a percentage of watched space in the particular media storage device as compared to each other media storage device from the multiple media storage devices; and
        a historical analysis showing a propensity to rewind and replay, in its entirety, the particular media file based on a genre of the particular media file; and
    determining, by one or more processors, which of the multiple media files is overwritten according to weighted criteria of:

a ratio of watched to unwatched space for the particular media file;

an amount of time since the particular media file was last viewed;

a percentage of watched space in the particular media storage device as compared to each other media storage device from the multiple media storage devices; and a historical analysis showing a propensity to rewind and replay, in its entirety, the particular media file based on a genre of the particular media file.

2. The method of claim 1, wherein the media storage device is from a group consisting of a Videocassette Recorder (VCR), a Personal Video Recorder (PVR), a Direct Access Storage Device (DASD), a hard file, and a video surveillance media.

3. A computer system comprising:

a processor, a computer readable memory, and a computer readable storage medium;

first program instructions to identify multiple friends, in a same social circle, that together have control of multiple media storage devices that are storing all segments of a media file, wherein the media file is a video file, wherein each of the multiple media storage devices contains a different media file from the multiple media files, wherein a particular media storage device stores a particular media file, wherein the media file is in a first format, and wherein the social circle is a group of persons who are members of a same social grouping via a social media network that groups together persons that have common interests and are from a same geographical location;

second program instructions to identify a last friend, from the multiple friends, who has control of a last media storage device to have a last copy of a particular segment of the media file, wherein the last media storage device is the only media storage device, from the multiple media storage devices, to have a copy of the particular segment of the media file;

third program instructions to prevent the last media storage device from deleting the particular segment of the media file until another of the multiple media storage devices stores a copy of the particular segment of the media file;

fourth program instructions to detect a marker on the video file, wherein the video file contains video content that is being displayed to a user, wherein the video content has been completely stored on recording media in a digital video recorder (DVR), and wherein the marker identifies a last position in the video content that has been displayed to a user before the user stopped playing the video content;

fifth program instructions to identify space on the DVR that holds content, from the video content, that has already been displayed to the user, wherein the marker identifies an endpoint of the content that has already been displayed to the user;

sixth program instructions to, in response to the user ceasing to view the video content, present a pop-up menu on a user display, wherein the pop-up menu provides options for controlling deletion of video content;

seventh program instructions to receive a user input from the pop-up menu, wherein the user input indicates an instruction from the user to automatically delete already viewed content from the video content, wherein the already viewed content has been presented to the user;

eighth program instructions to delay automatic deletion of the video content that has already been displayed to the user until after a predefined grace period, wherein automatic deletion of the video content can be overridden by the user during the predefined grace period;

ninth program instructions to detect that the predefined grace period has passed after receipt of the user input from the pop-up menu;

tenth program instructions to, in response to detecting that the predefined grace period has passed after receipt of the user input from the pop-up menu, delete the already viewed content from the video content;

eleventh program instructions to determine that the content from the video content that has already been displayed to the user includes a first portion and a second portion of the video content, wherein the first portion is stored in a first area of the recording media in the DVR, wherein the second portion is stored in a second area of the recording media in the DVR, and wherein the second area of the recording media in the DVR follows the first area of the recording media;

twelfth program instructions to store new content on the first area of the recording media while reserving the second area of the recording media for rewinding operations, wherein the rewinding operations allow the user to re-view the second portion from the second area of the recording media;

thirteenth program instructions to locate a copy of the particular segment of the media file in a second format in a different media storage device, wherein the different media storage device is different from the last media storage device, and wherein the different media storage device is one of the multiple media storage devices;

fourteenth program instructions to, in response to determining that said another of the multiple storage devices does not have a copy of the particular segment of the media file in the first format, retrieve the copy of the particular segment of the media file in the second format from the different media storage device;

fifteenth program instructions to weight criteria for:

a ratio of watched to unwatched space for the particular media file;

an amount of time since the particular media file was last viewed;

a percentage of watched space in the particular media storage device as compared to each other media storage device from the multiple media storage devices; and a historical analysis showing a propensity to rewind and replay, in its entirety, the particular media file based on a genre of the particular media file; and sixteenth program instructions to determine which of the multiple media files is overwritten according to weighted criteria of:

a ratio of watched to unwatched space for the particular media file;

an amount of time since the particular media file was last viewed;

a percentage of watched space in the particular media storage device as compared to each other media storage device from the multiple media storage devices; and a historical analysis showing a propensity to rewind and replay, in its entirety, the particular media file based on a genre of the particular media file;

and wherein said first, second, third, fourth, fifth, sixth, seventh, eighth, ninth, tenth, eleventh, twelfth, thirteenth, fourteenth, fifteenth, and sixteenth program instructions are stored on said computer readable storage medium for execution by said processor via said computer readable memory.

4. The computer system of claim 3, wherein the media storage device is from a group consisting of a Videocassette Recorder (VCR), a Personal Video Recorder (PVR), a Direct Access Storage Device (DASD), a hard file, and a video surveillance media.

\* \* \* \* \*